United States Patent
Zhou (10) Patent No.: US 10,094,246 B2
(45) Date of Patent: Oct. 9, 2018

(54) WASTE HEAT RECOVERY FOR POWER GENERATION AND ENGINE WARM UP

(71) Applicant: Ford Global Technologies, LLC, Dearborn, MI (US)

(72) Inventor: Shiguang Zhou, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 53 days.

(21) Appl. No.: 15/340,815

(22) Filed: Nov. 1, 2016

(65) Prior Publication Data

US 2018/0119578 A1 May 3, 2018

(51) Int. Cl.
F01K 23/06 (2006.01)
F01K 23/10 (2006.01)
F01N 5/02 (2006.01)
H02K 7/18 (2006.01)

(52) U.S. Cl.
CPC ............ F01K 23/065 (2013.01); F01K 23/10 (2013.01); F01N 5/02 (2013.01); H02K 7/1823 (2013.01); F05D 2220/62 (2013.01)

(58) Field of Classification Search
CPC ..... F01K 23/065; F01K 23/10; H02K 7/1823; F01N 5/02; F05D 2220/62
USPC ................................. 60/602, 605.2
See application file for complete search history.

(56) References Cited

U.S. PATENT DOCUMENTS

| 6,880,344 | B2 | 4/2005 | Radcliff et al. | |
|---|---|---|---|---|
| 7,017,357 | B2* | 3/2006 | Brasz | F01K 25/08 62/115 |
| 8,893,495 | B2* | 11/2014 | Dane | F01K 23/065 60/273 |
| 9,702,289 | B2* | 7/2017 | Dane | F01N 3/2006 |
| 2010/0018207 | A1* | 1/2010 | Juchymenko | F01K 23/065 60/670 |
| 2014/0013743 | A1* | 1/2014 | Dane | F01K 23/065 60/615 |
| 2015/0040541 | A1* | 2/2015 | Dane | F01K 23/065 60/274 |
| 2016/0201519 | A1 | 7/2016 | Zhou | |

* cited by examiner

Primary Examiner — Patrick Maines
Assistant Examiner — Dapinder Singh
(74) Attorney, Agent, or Firm — Julia Voutyras; McCoy Russell LLP (57) ABSTRACT

Methods and systems are provided for heating an engine and generating energy from a common waste heat recovery system. In one example, a method comprises, responsive to a first condition, expanding a working fluid of a waste heat recovery system via an expander to generate electricity, and responsive to a second condition, compressing the working fluid of the waste heat recovery system via the expander to transfer heat to an engine.

20 Claims, 5 Drawing Sheets

WASTE HEAT RECOVERY FOR POWER GENERATION AND ENGINE WARM UP

FIELD

The present description relates generally to methods and systems for controlling a waste heat recovery system to both generate power and warm an engine.

BACKGROUND/SUMMARY

A waste heat recovery system for a vehicle may recover thermal energy from engine exhaust, engine coolant, engine oil, and/or transmission fluid that would otherwise be dissipated to ambient surroundings. Waste heat recovery systems typically include a heat exchanger(s) to absorb heat from the engine coolant, engine oil, and/or transmission fluid, an evaporator to heat up the working fluid, an expander to produce mechanical work, a condenser to cool down the working fluid, and a pump to push the working fluid back to the heat exchanger(s). The mechanical work may then be converted energy via a generator for storage in a vehicle battery, for example.

One example waste heat recovery system is shown by Zhou in U.S. Patent Application Publication No. 2016/0201519. Therein, a vehicle is provided with an engine. The vehicle also has an expander, a condenser, and a pump in sequential fluid communication in a closed loop containing an evaporator configured to transfer heat between exhaust gas from the engine and a working fluid.

However, the inventors herein have recognized potential issues with such systems. As one example, vehicles typically include heat transfer systems in order to heat engine coolant, engine oil, and/or transmission fluid at engine cold start conditions to improve engine efficiency and reduce emissions. Such systems, which are separate from waste heat recovery systems, typically require at the minimum a heat exchanger, a heating loop, and several control valves, which increase system cost and packaging space.

In one example, the issues described above may be addressed by a method comprising, responsive to a first condition, expanding a working fluid of a waste heat recovery system via an expander to generate electricity, and responsive to a second condition, compressing the working fluid of the waste heat recovery system via the expander to transfer heat to an engine. In this way, the expander of the waste heat recovery system may be differentially operated to either convert waste heat to energy (e.g., electricity) for storage in a vehicle battery, for example, or to pump the working fluid to transfer absorbed waste heat to the engine via one or more engine component heat exchangers, for example.

As one example, working fluid in the waste heat recovery system may be heated via an evaporator in thermal communication with exhaust gas from the engine. Then, the heated working fluid is directed to the expander via either a first flow path or a second flow path. Directing the working fluid through the first flow path causes the working fluid to expand across the expander, and this expansion drives rotation of the expander in a first direction, which in turn drives a generator to generate the electricity. Directing the working fluid through the second flow path causes the working fluid to be compressed at the expander via rotation of the expander in a second direction, driven by a motor. The compressed working fluid is pressurized by the compression to a sufficient degree to drive the working fluid to flow through the one or more engine component heat exchangers. By doing so, both engine heating and waste heat energy generation may be provided by a single system, reducing or eliminating the need for engine cooling system valves, heat exchangers, and/or other components. Further, by flowing the working fluid directly from the expander to the one or more engine component heat exchangers via the expander rotating in the second direction, heat loss at other components of the system (e.g., condenser, pump, and associated conduits) may be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A Rankine cycle may be used to convert thermal energy into mechanical or electrical power. Efforts have been made to collect thermal energy more effectively or from more than one system that rejects waste heat in the vehicle such as engine coolant, engine or transmission oil, exhaust gas recirculation (EGR) gases, exhaust gases, etc. The present disclosure provides for a Rankine cycle waste heat recovery system configured to operate in warm up mode or engine cooling mode in addition to a power generation mode. This is accomplished by including additional working fluid flow paths in the system, including a first flow path coupling an outlet of an evaporator to an outlet of an expander and a second flow path coupling an inlet of the expander to an outlet of a pump. During a standard power generation mode, the expander is operated in a forward direction to expand the working fluid and extract mechanical energy from the working fluid, and the working fluid is further cooled by a condenser and then pumped back to a waste heat recovery heat exchanger (also referred to as an evaporator). During the power generation mode, the working fluid bypasses one or more engine heat exchangers (e.g., an engine coolant heat exchanger, engine oil heat exchanger, etc.).

During an engine warm up mode, the expander is operated in reverse to compress the working fluid and send it back to the engine system heat exchangers, bypassing the condenser and pump. By compressing the working fluid rather than expanding it, the working fluid may transfer heat to the engine coolant, engine oil, etc., expediting engine warm up. Further, during a cooling mode, the expander may be operated in the forward direction to expand the working fluid and cool the working fluid at the condenser, and the cooled working fluid may be subsequently directed through engine heat exchangers to cool the engine coolant, engine oil, and/or other engine fluids.

Figure 1:
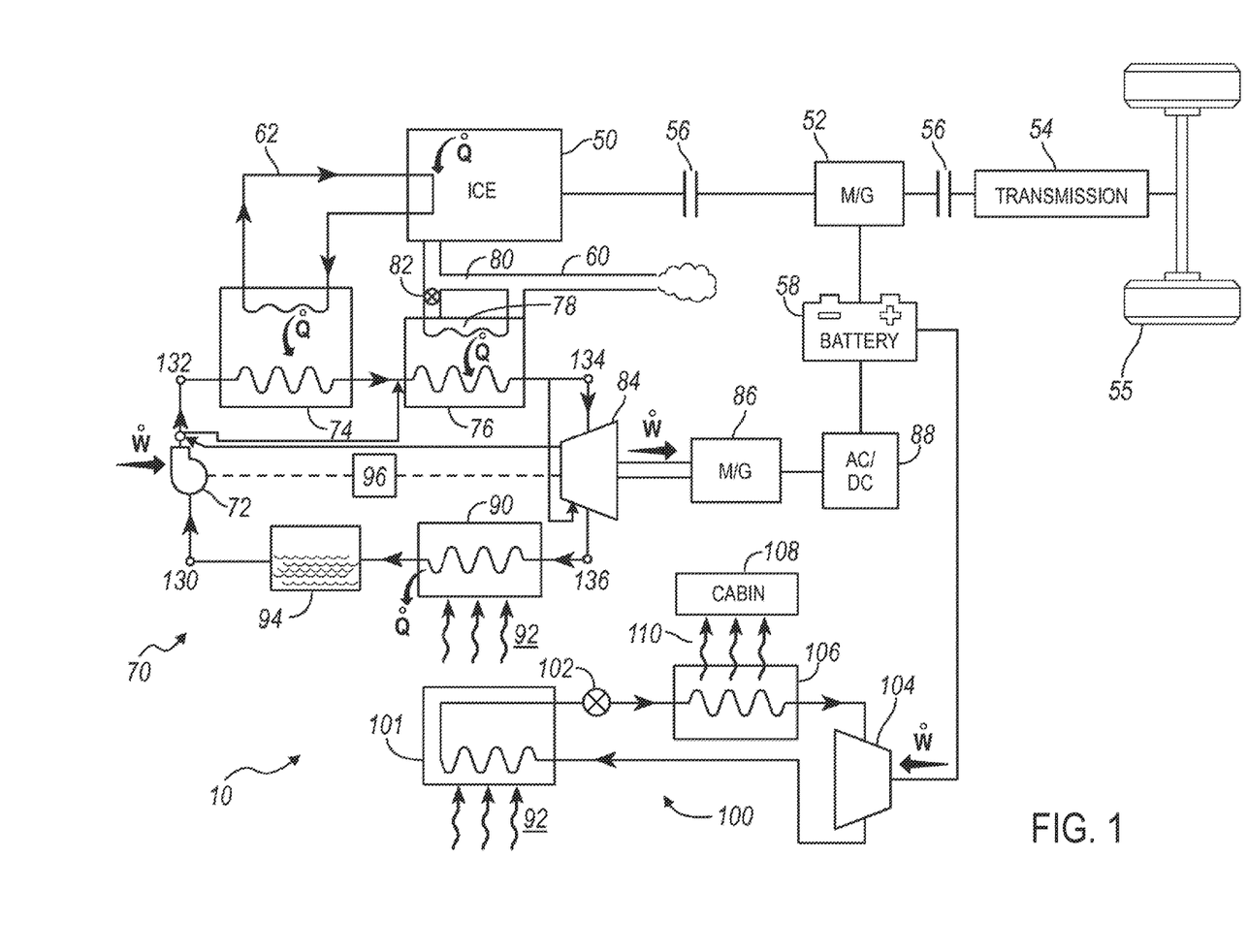
FIG. 1 schematically shows an example exhaust waste recovery system that may be coupled to an engine and installed in a vehicle.

FIG. 1 illustrates a simplified schematic of various systems within a vehicle 10 according to an example. Fluids in various vehicle systems may be cooled via heat transfer to a working fluid within heat exchangers of a Rankine cycle, and the working fluid is in turn cooled in a condenser of the Rankine cycle using ambient air. The Rankine cycle allows for energy recovery by converting waste heat in the vehicle 10 to electrical power or mechanical power that would otherwise be transferred to ambient air as waste heat.

The vehicle may be a hybrid vehicle with multiple sources of torque available to the vehicle wheels. In other examples, the vehicle is a conventional vehicle with only an engine, or is an electric vehicle with only electric machine(s). In the example shown, the vehicle has an internal combustion engine 50 and an electric machine 52. The electric machine 52 may be a motor or a motor/generator. The engine 50 and the electric machine 52 are connected via a transmission 54 to one or more vehicle wheels 55. The transmission 54 may be a gearbox, a planetary gear system, or other transmission. Clutches 56 may be provided between the engine 50, the electric machine 52, and the transmission 54. The powertrain may be configured in various manners including as a parallel, a series, or a series-parallel hybrid vehicle.

The electric machine 52 receives electrical power to provide torque to the wheels 55 from a traction battery 58. The electric machine 52 may also be operated as a generator to provide electrical power to charge the battery 58, for example, during a braking operation.

The engine 50 may be an internal combustion engine such as a compression ignition engine or spark ignition engine. The engine 50 has an exhaust system 60 through which exhaust gases are vented from cylinders in the engine 50 to atmosphere. The exhaust system 60 may include a muffler for noise control. The emissions system 60 may also include an emissions system, such as a catalytic converter, particulate filter, and the like.

The engine 50 also has a coolant system 62. The coolant system contains an engine coolant fluid, which may include water, glycol, and/or another fluid, to remove heat from the engine 50 during operation. The engine 50 may be provided with an internal or external cooling jacket with passages to remove heat from various regions of the engine 50 using the recirculating engine coolant fluid. The coolant system 62 may include a pump and a reservoir (not shown).

The vehicle has a waste heat recovery system 70. In one example, the waste heat recovery system 70 is a system configured to convert heat to energy using the Rankine cycle. In another example, the waste heat recovery system 70 utilizes a modified Rankine cycle, or another thermodynamic cycle that includes a working fluid transitioning through more than one phase during cycle operation. The waste heat recovery system 70 contains a working fluid. In one example, the working fluid undergoes phase change and is a mixed phase fluid within the system that it exists as both a vapor phase and a liquid phase. The working fluid may be R-134a, R-245, or another organic or inorganic chemical refrigerant based on the desired operating parameters of the cycle.

The waste heat recovery system 70 has a pump 72, compressor, or other device configured to increase the pressure of the working fluid. The pump 72 may be a centrifugal pump, a positive displacement pump, etc. The working fluid flows from the pump 72 to one or more heat exchangers. The heat exchangers may be preheaters, evaporators, superheaters, and the like configured to transfer heat to the working fluid.

The example shown has a first heat exchanger 74, which is configured as a preheater. A second heat exchanger 76 is provided, and may be configured as an evaporator. In other examples, greater or fewer heat exchangers may be provided downstream of the pump 72. For example, the waste heat recovery system 70 may be provided only with heat exchanger 76, or may be provided with three or more heat exchangers to heat the working fluid (as in the example illustrated in FIGS. 2 and 3, described in more detail below). Additionally, the heat exchangers downstream of the pump 72 may be arranged or positioned in various manners relative to one another, for example, in parallel, in series as shown, or in a combination of series and parallel flows.

The heat exchangers 74, 76 are configured to transfer heat from an outside heat source to heat the working fluid within the waste heat recovery system 70 and cause a phase change from liquid to vapor phase. In the example shown, the heat exchanger 74 is configured to transfer heat from the engine coolant fluid in coolant loop 62 to the working fluid in the waste heat recovery system 70. The temperature of the engine coolant is therefore reduced before returning to the engine 50 to remove heat therefrom and heat exchanger 74 acts as a heat sink in the coolant system 62. The temperature of the working fluid of the waste heat recovery system 70 is likewise increased within the heat exchanger 74.

In other examples, as discussed in greater detail below, the heat exchanger 74 is configured to transfer heat to the working fluid of the waste heat recovery system 70 from another fluid in a vehicle system, including, but not limited to, an engine lubrication fluid, a transmission lubrication fluid, and a battery cooling fluid. In a further example, multiple preheating heat exchangers 74 are provided and are each in fluid communication with a separate vehicle system to receive heat therefrom. Valving or another flow control mechanism may be provided to selectively direct and control flow to the multiple heat exchangers.

In another example, the heat exchanger 74 is positioned downstream of the heat exchanger 76 such that it is configured as a superheater, and transfers heat from a fluid from various vehicle systems, including, but not limited to, exhaust gas recirculation (EGR) flow. The heat exchanger 74 provides a heat sink for the EGR flow, and thereby provides waste heat to the working fluid in the waste heat recovery system 70. The positioning of the heat exchanger 74 relative to heat exchanger 76 may be based on an average temperature or available heat in the waste heat fluids of the vehicle systems.

A second heat exchanger 76 is also provided in the waste heat recovery system 70. The heat exchanger 76 is configured to transfer heat to the working fluid of the cycle from exhaust gases in the engine exhaust system 60 in one example. The engine exhaust system 60 may have a first flow path 78 through or in contact with the heat exchanger 76. The engine exhaust system 60 may also have a second, or bypass, flow path 80 to divert exhaust gas flow around the heat exchanger 76. A valve 82 may be provided to control the amount of exhaust gas flowing through the heat exchanger 76, which in turn provides a control over the amount of heat transferred to the working fluid, and the temperature and state of the working fluid at the exit of the heat exchanger 76 or upstream of the expander 84.

At least one of the heat exchangers 74, 76 is configured to transfer sufficient heat to the working fluid in the waste heat recovery system 70 to evaporate the working fluid, as discussed further below. The evaporator receives the working fluid in a liquid phase or liquid-vapor mixed phase solution, and heats the working fluid to a vapor phase or superheated vapor phase. The disclosure generally describes using heat exchanger 76 as an evaporator using the engine exhaust 60, however in some examples, heat exchanger 74 in the waste heat recovery system 70 may be provided as the evaporator.

The expander 84 may be a turbine, such as a centrifugal or axial flow turbine, or another similar device. The expander 84 is rotated or actuated by the working fluid to produce work as the working fluid expands. The expander 84 may be connected to a motor/generator 86 to rotate the motor/generator to generate electrical power, or to another mechanical linkage to provide additional mechanical power to the driveshaft and wheels 55. The expander 84 may be connected to the generator 86 by a shaft or another mechanical linkage. The generator 86 is connected to the battery 58 to provide electrical power to charge the battery 58. An inverter or AC-DC converter 88 may be provided between the generator 86 and the battery 58.

The working fluid leaves the expander 84 and flows to a heat exchanger 90, also referred to as a condenser 90 in the waste heat recovery system 70. The condenser 90 may be positioned in a front region of the vehicle 10. The condenser 90 is configured to be in contact with an ambient air flow 92 such that heat is transferred from the working fluid to the ambient air flow 92 to remove heat from the working fluid and cool and/or condense the working fluid. The condenser 90 may be single stage or multiple stages, and the flow of the working fluid may be controllable through the various stages as indicated by the waste heat recovery system 70 using valves or other mechanisms.

In some examples, the waste heat recovery system 70 includes a fluid accumulator 94 or dryer. The accumulator 94 may be provided as a fluid or liquid reservoir for the working fluid in the waste heat recovery system 70. The pump 72 draws fluid from the accumulator 94 to complete the waste heat recovery system 70. The waste heat recovery system 70 is a closed loop cycle such that the working fluid does not mix with other fluids in the vehicle or with ambient air.

The waste heat recovery system 70 may include a controller 96 that is configured to operate the waste heat recovery system within predetermined parameters as described below. The controller 96 may be in communication with the pump 72, expander 84, and various valves and/or sensors in the waste heat recovery system 70 and vehicle 10.

The controller 96 may be incorporated with or be in communication with an engine control unit (ECU), a transmission control unit (TCU), a vehicle system controller (VSC), or the like, and may also be in communication with various vehicle sensors. The control system for the vehicle 10 may include any number of controllers, and may be integrated into a single controller, or have various modules. Some or all of the controllers may be connected by a controller area network (CAN) or other system. The controller 96 and the vehicle control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle or the waste heat recovery system 70.

The vehicle may also be provided with an air conditioning system 100 in one or more embodiments. The air conditioning system 100 may form a part of a heating, ventilation, and air conditioning (HVAC) system for the vehicle 10. The HVAC 100 system provides air at a controlled temperature to the vehicle or passenger cabin for cabin climate control by the vehicle occupants. The air conditioning system 100 has a first heat exchanger 101 or condenser in contact with the ambient air 92. The condenser 101 may be positioned in the front region of the vehicle 10. The condenser 101 is configured for heat transfer between ambient air and a refrigerant or other fluid in the system 100.

The air conditioning system 100 may also include an expansion device, valve, or throttle 102, and a compressor or pumping device 104. The system 100 has another heat exchanger 106 in contact with air flow 110 to be directed to the vehicle cabin 108, and the refrigerant in the system 100. Air flow 110, which is intended for cabin conditioning, flows over and is cooled by refrigerant in the heat exchanger 106, and then flows to the cabin 108 as required by the vehicle occupants.

As described above, the waste heat recovery system 70 may be operated to generate power by expanding a working fluid after the working fluid is heated via heat exchange from the engine exhaust, for example. While such a cycle allows for energy recovery that would otherwise be wasted, the cycle may be of limited use during some conditions, such as engine cold start conditions, owing to a lack of available heat from the engine and/or a desire to direct all exhaust heat to downstream emission control devices to expedite light-off. Thus, the waste heat recovery system 70 may be modified to operate in "reverse," where the expander is driven by the motor/generator to operate in a reverse direction, thus compressing the working fluid rather than expanding the working fluid. By compressing the working fluid, the compressed working fluid may be directed to the various vehicle heat exchangers (such as heat exchanger 74) without passing through the condenser or pump of the waste heat recovery system, thus avoiding heat loss. The heat from the compressed working fluid may then be transferred to the engine coolant and/or other vehicle fluids, thus expediting engine warm up.

Figure 2:
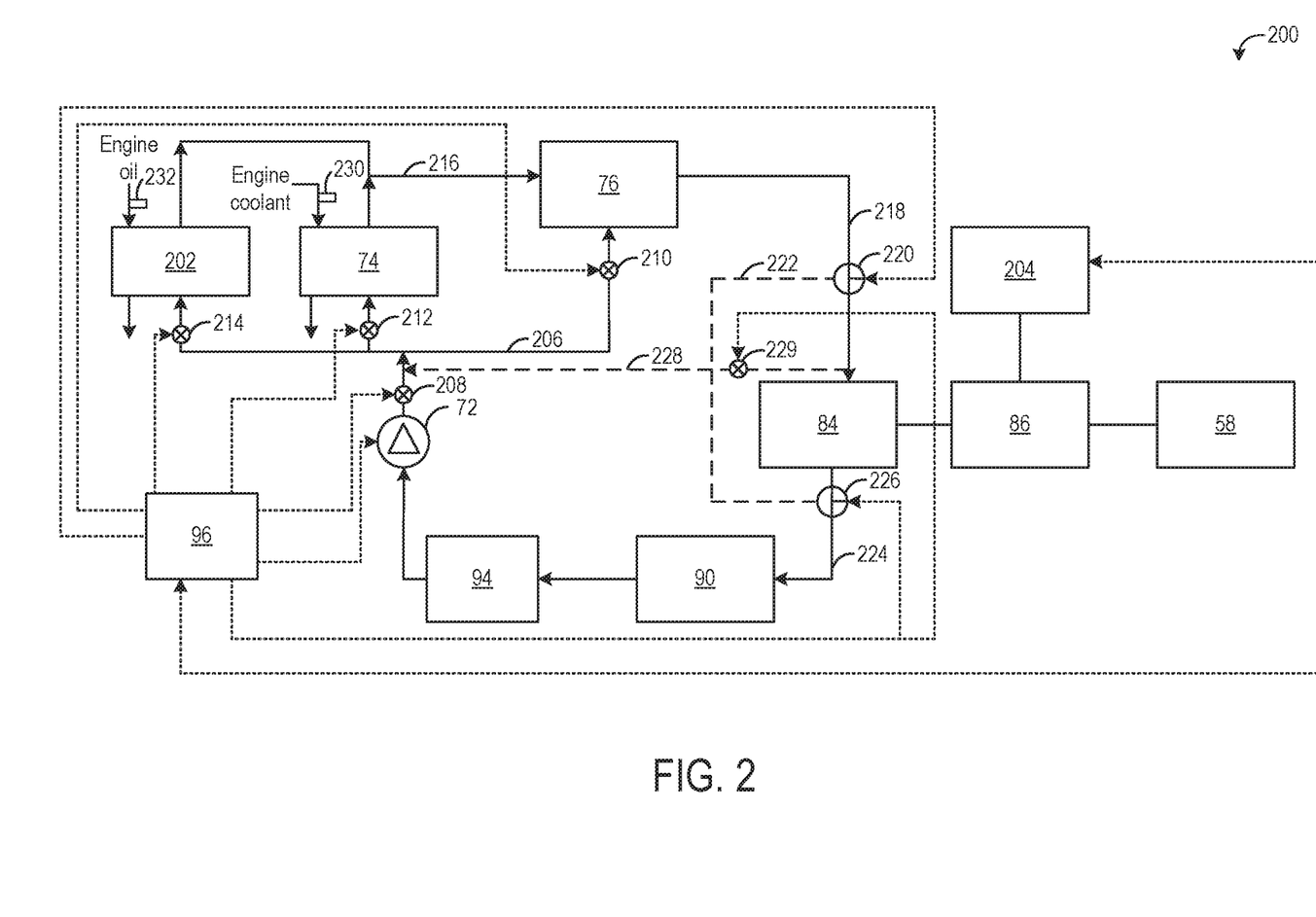
FIG. 2 schematically shows components of the example exhaust waste recovery system of FIG. 1 operated in a first operating mode.
Figure 3:
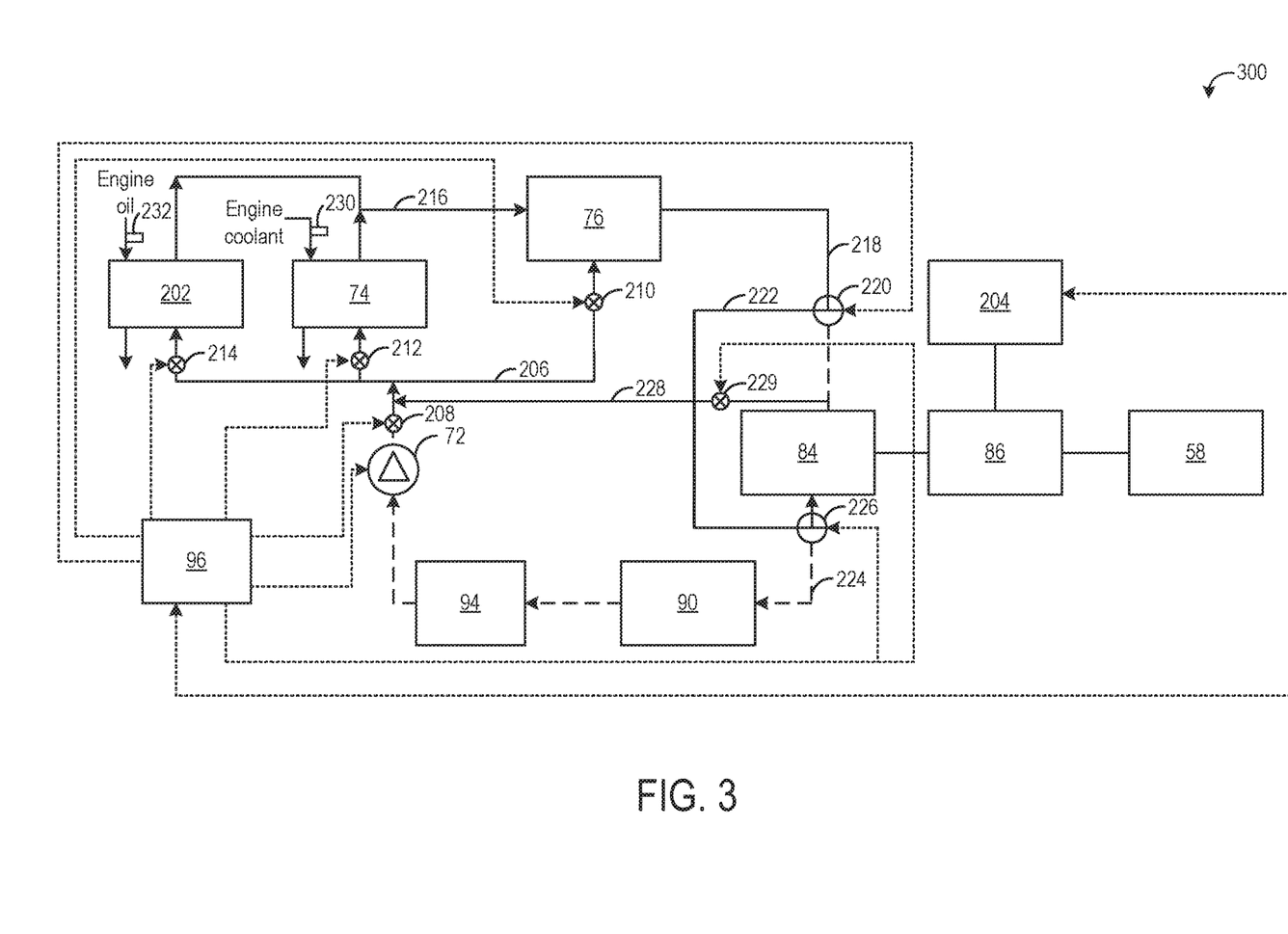
FIG. 3 schematically shows components of the example exhaust waste recovery system of FIG. 1 operated in a second operating mode.

FIGS. 2 and 3 schematically show the components of an example waste heat recovery system during a first operating mode 200 (FIG. 2) and during a second operating mode 300 (FIG. 3). The example waste heat recovery system of FIGS. 2-3 is a non-limiting example of waste heat recovery system 70 of FIG. 1, and as such like components are given the same numbers and additional description is dispensed with.

Referring first to FIG. 2, the waste heat recovery system in the first operating mode 200 is illustrated. The first operating mode 200 includes a power generation mode, where the expansion of the working fluid is used to generate power via rotation of the motor/generator 86. Thus, as shown, working fluid in the system is pumped from pump 72 to a first evaporator supply line 206 via a first valve 208. The first evaporator supply line is fluidically coupled to an inlet of the evaporator 76 via a second valve 210. Thus, when each of the first valve 208 and the second valve 210 is at least partially open, working fluid flows from the pump 72 to the evaporator 76. In the evaporator 76, the working fluid is heated via heat exchange with engine exhaust gas, as explained above with respect to FIG. 1.

Further, the first evaporator supply line 206 may also be in fluidic communication with one or more heat exchangers. As shown, the first evaporator supply line 206 is fluidically coupled to heat exchanger 74 via a third valve 212 and to a second heat exchanger 202 via a fourth valve 214. As explained previously, heat exchanger 74 may be fluidically coupled to an engine coolant system, and thus may transfer heat between the working fluid and engine coolant. Second heat exchanger 202 may be fluidically coupled to an engine oil system or to an engine transmission fluid system, and thus may transfer heat between the working fluid and engine oil and/or transmission fluid. When valves 212 and/or 214 are at least partially open, the working fluid flows through the heat exchanger 74 and/or second heat exchanger 202 and to a second evaporator supply line 216, which is fluidically coupled to the inlet of the evaporator 76.

The evaporator 76 is coupled to an expander inlet line 218 that is also fluidically coupled to an inlet of the expander 84. A fifth valve 220 is positioned in the expander inlet line 218 and is fluidically coupled to a compressor inlet line 222. The fifth valve 220 may be a three-way valve. When the fifth valve 220 is in a first position, as shown in FIG. 2, fluidic coupling between the evaporator outlet and the expander inlet is established, such that the working fluid flows to the expander inlet. When the fifth valve 220 is in the first position, fluidic coupling between the evaporator 76 and the compressor inlet line 222 is blocked.

The expander 84 is fluidically coupled to an expander outlet line 224. Flow of working fluid through the expander outlet line 224 is controlled via a sixth valve 226, which in the illustrated example is a three-way valve that is also fluidically coupled to the compressor inlet line 222. During the first operating mode, when the sixth valve is in a first position, working fluid that expands across the expander 84 flows to the condenser 90, where the working fluid is cooled, as explained above with respect to FIG. 1. After flowing through the condenser, the working fluid flows through the drier 94 en route to the pump 72.

Also illustrated in FIG. 2 is a compressor outlet line 228 that fluidically couples the inlet of the expander 84 to the first evaporator supply line 206. The compressor outlet line 228 is coupled to the first evaporator supply line 206 at a position that is downstream of the first valve 208 and upstream of the second valve 210, and also upstream of the conduits that lead to the heat exchangers 74, 202 (and upstream of third valve 212 and fourth valve 214). A seventh valve 229 is positioned in the compressor outlet line 228. During the first operating mode, the seventh valve 229 may be closed to block fluidic communication between the expander inlet and first evaporator supply line 206.

As mentioned above, the first operating mode is a power generation mode. Thus, when the working fluid flows from the evaporator and through the expander, the working fluid drives the expander to rotate in a first, forward direction. The rotation of the expander in turn rotates the stator of the generator 86, producing electrical energy that is stored in battery 58. After the working fluid expands across the expander, the working fluid is condensed at the condenser and the now-cooled working fluid is pumped back through the evaporator to absorb additional heat and repeat the cycle. Further, based on the position of the third valve 212 and fourth valve 214, at least some of the working fluid may flow through the heat exchangers 74, 202, which may cause additional heat to be transferred to the working fluid. In some examples, during the power generation mode, the third valve 212 and the fourth valve 214 may be closed, and hence all of the working fluid may flow directly from the pump 72 to the evaporator 76. In other examples, the third valve 212 and fourth valve 214 may be opened to allow the working fluid to absorb heat from the engine coolant, engine oil, and/or transmission fluid. The position of the third valve 212 and fourth valve 214 may be controlled based on respective temperatures of the vehicle fluids, e.g., the third valve 212 may be controlled as a function of engine coolant temperature and the fourth valve 214 may be controlled as a function of engine oil temperature.

Each of first valve 208, second valve 210, third valve 212, fourth valve 214, fifth valve 220, sixth valve 226, and seventh valve 229 may be actuated by a suitable actuator responsive to a command from controller 96. For example, each valve may be actuated by a respective electric actuator, hydraulic actuator, pneumatic actuator, or other suitable actuator. Further, in some examples, at least some of the valves (e.g., third valve 212 and fourth valve 214) may be thermostat valves, where the opening and closing of the valve is directly or indirectly controlled via a temperature of a suitable fluid (e.g., engine coolant for third valve 212). The controller 96 is also configured to regulate operation of pump 72 (e.g., turn on the pump 72 responsive to operation in the first operating mode). Controller 96 may be in further communication with a switch control 204 that is coupled to motor/generator 86. The switch control 204 may command the motor/generator to operate as a generator in the first mode of operation, responsive to a command from controller 96.

The controller 96 receives signals from various sensors and employs various actuators to adjust system operation based on the received signals and instructions stored on a memory of the controller. For example, controller 96 receives signals from an engine coolant temperature sensor 230 and an engine oil temperature sensor 232 and determines the temperature of the engine and engine oil from the received signals. Controller 96 may then determine if the engine temperature is above an upper limit threshold temperature (e.g., maximum desired operating temperature), and if so, controller 96 may trigger the actuator coupled to third valve 212 in order to open third valve 212 and cool the engine coolant via heat exchange with the working fluid in heat exchanger 74.

Referring next to FIG. 3, the waste heat recovery system in the second operating mode 300 is illustrated. The second operating mode 300 includes an engine warm up mode, where the compression of the working fluid via the expander operating in reverse (in which the expander operates as a compressor) is used to pump the working fluid from the evaporator to the heat exchangers to expedite engine warm up. Thus, as shown, each of the fifth valve 220 and the sixth valve 226 is adjusted to a respective second position when the system initiates operation in the second mode of operation. In the second position of the fifth valve 220, fluidic communication between the outlet of the evaporator 76 and the inlet of the expander 84 via the expander inlet line 218 is blocked, and fluidic communication between the outlet of the evaporator 76 and the sixth valve 226 is established. When the sixth valve 226 is in the second position, fluidic coupling between the outlet of the expander 84 and the condenser via expander outlet line 224 is blocked, and fluidic communication between the outlet of the expander 84 and the compressor inlet line 222 is established. As a result, working fluid from the evaporator is directed to the expander outlet, which is now functioning as a compressor inlet of the expander. The compressor inlet of the expander may be the same opening as the outlet of the expander, when the expander is operating as a turbine, such that the working fluid now flows into the expander via the (turbine) outlet of the expander. The expander is operated as a compressor, and as such the working fluid is compressed rather than expanded.

To drive the expander as a compressor, the motor/generator 86 is operated as a motor via power supplied from batter 58. The controller 96 may command the switch control 204 to supply electrical energy from the battery 58 to the motor. Rotation of the motor results in rotation of the expander in a second, reverse direction. As used herein, the "reverse" direction is reverse with respect to the first (forward) direction.

The compressed working fluid exits out of the expander via the inlet of the expander, which is now functioning as a compressor outlet, and the working fluid flows to the compressor outlet line 228. The compressor outlet of the expander may be the same opening as the inlet of the expander, when the expander is operating as a turbine, such that the working fluid now flows out of the expander via the (turbine) inlet of the expander.

The compressor outlet line 228 is fluidically coupled to the first evaporator supply line 206 via the seventh valve 229 being open. The first valve 208 is adjusted to a fully closed position when the system initiates operation in the second mode of operation. As such, fluidic communication between the outlet of the pump 72 and the first evaporator supply line 206 is blocked, and fluidic communication between the compressor outlet line 228 and the first evaporator supply line 206 is established. As a result, the compressed working fluid flows through the first evaporator supply line 206.

In the second mode of operation, working fluid flow through one or more of the heat exchangers may be established via opening of one or more of the third valve 212 and fourth valve 214. In one example, both the third valve 212 and fourth valve 214 may be opened (e.g., fully opened) to allow the working fluid to flow through both the heat exchanger 74 and second heat exchanger 202. In doing so, heat from the working fluid is transferred to the engine coolant, which as shown in FIG. 1 subsequently travels to the engine, thus providing rapid engine warm-up. Additionally, the heat from the working fluid is transferred to the engine oil and/or transmission fluid, decreasing oil and/or transmission fluid viscosity, enabling more efficient engine and transmission operation. Each of the heat exchanger 74 and second heat exchanger 202 is configured to receive engine coolant and engine oil (or transmission fluid), respectively, and as such any valves or other control elements that might otherwise restrict or block flow of engine coolant, engine oil, and/or transmission fluid to the corresponding heat exchanger are opened during the second mode of operation.

After the working fluid flows through the heat exchanger 74 and second heat exchanger 202, the working fluid then flows to the evaporator 76, where the (now cooler) working fluid is heated by the engine exhaust to repeat the cycle. During the second mode of operation, the second valve 210 may be closed, in order to direct all the working fluid through the heat exchanger 74 and second heat exchanger 202. However, in some examples, the second valve 210 may be partially or fully open to allow at least some working fluid to flow through the evaporator without flowing through the vehicle heat exchangers. Additionally, in the second mode of operation, the pump 72 is disabled.

The waste heat recovery system 70 illustrated in FIGS. 2 and 3 includes a three-way valve upstream of the expander and a three-way valve downstream of the expander, as well as two-way valves in the compressor outlet line, first evaporator supply line, and between the pump and the first evaporator supply line. However, other valve configurations are within the scope of this disclosure. For example, the first valve 208 and seventh valve 229 may be dispensed with and a three-way valve at a junction between the pump outlet, first evaporator supply line, and compressor outlet line may be present to control working fluid flow from the pump and/or expander to the heat exchangers and/or evaporator. Additionally or alternatively, the sixth valve 226 may be a two-way valve. Other valve configurations are possible.

Figure 4:
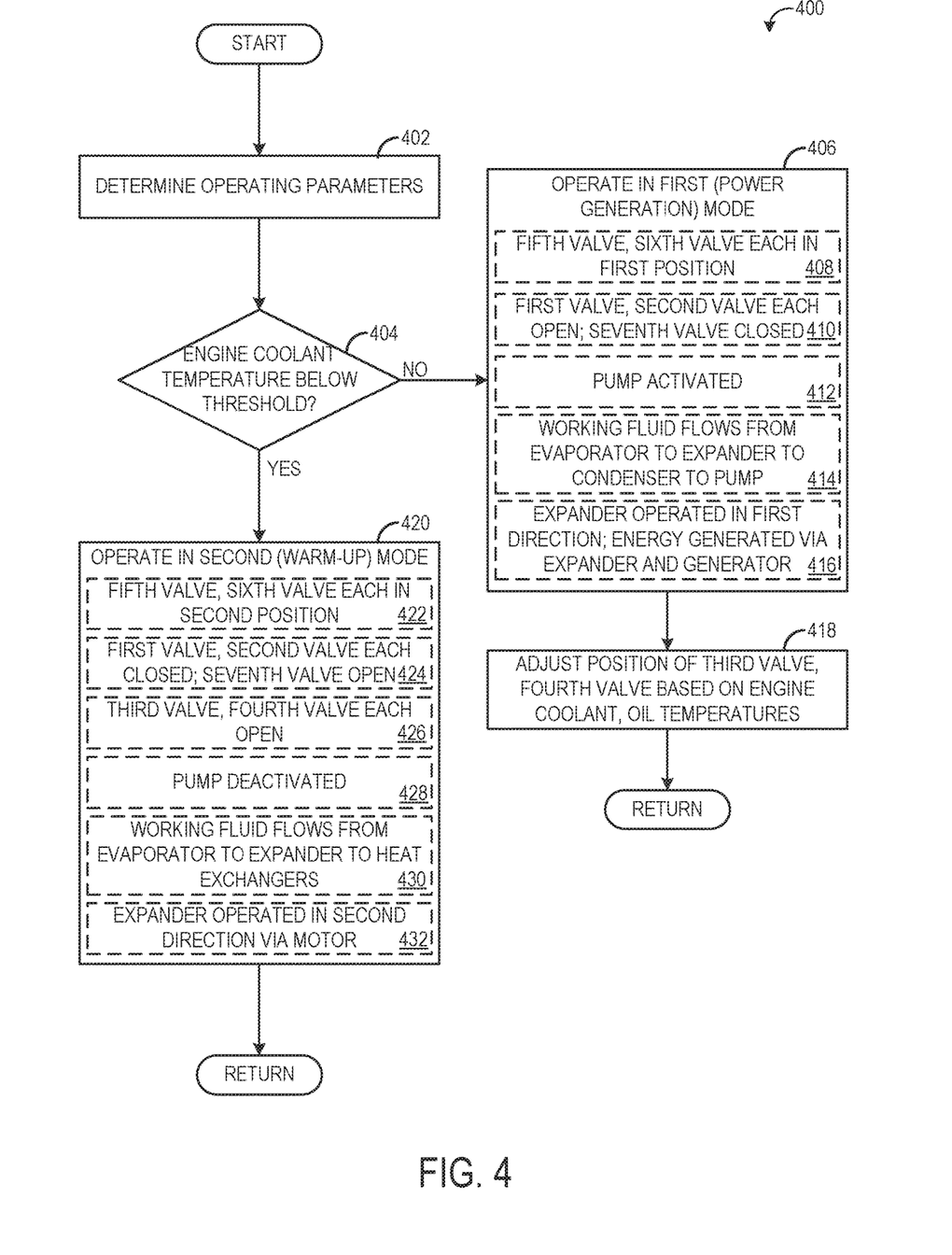
FIG. 4 is a flow chart illustrating a method for operating the waste heat recovery system of FIGS. 1-3.

FIG. 4 is a flow chart illustrating a method 400 for controlling a waste heat recovery system, such as the system 70 described above with respect to FIGS. 1-3. Instructions for carrying out method 400 may be executed by a controller (e.g., controller 96) based on instructions stored on a memory of the controller and in conjunction with signals received from sensors of the engine system, such as the sensors 230 and 232 described above. The controller may employ actuators of the system to adjust system operation, according to the methods described below.

At 402, method 400 includes determining operating parameters. The determined operating parameters may include engine coolant temperature (as determined from signals received from sensor 230), engine oil and/or transmission fluid temperature (as determined from signals received from sensor 232 and/or a transmission fluid temperature sensor), current waste heat recovery system operating mode (e.g., first operating mode of FIG. 2 or second operating mode of FIG. 3), elapsed time since an engine start event, exhaust temperature (as determined from a temperature sensor positioned in the exhaust system 600), and/or additional parameters.

At 404, method 400 includes determining if engine coolant temperature is below a threshold temperature. The threshold temperature may be a target engine operating temperature, such as 190° F. If the engine coolant temperature is below the threshold temperature, method 400 proceeds to 420 to operate in the second operating mode, which will be described in more detail below. If the engine coolant temperature is not below the threshold temperature, method 400 proceeds to 406 to operate in the first operating mode, where the waste heat recovery system is controlled to generate power from waste heat via the engine exhaust, as explained above with respect to FIG. 2. In some examples, the determination as to whether to operate in the first operating mode or the second operating mode may be based on additional or alternative parameters than engine coolant temperature, such as elapsed time since an engine start event. For example, the system may automatically operate in the second operating mode in order to expedite engine warm up following an engine start event. Then, after a predetermined amount of time has elapsed since the engine start (e.g., five minutes), the system may be switched to operate in the first operating mode to generate energy from the waste heat of the engine exhaust.

Operating the waste heat recovery system in the first operating mode may include adjustments to various valves in order to flow working fluid through an evaporator, where waste heat from the engine exhaust (or other suitable waste heat source) is transferred to the working fluid. Then, after the working fluid flows through the evaporator, the working fluid is expanded across an expander. The expansion of the working fluid, which occurs as a result of the expander acting as a turbine, thus drives rotation of a stator of generator, for example, thus generating electricity for storage in a suitable energy storage device. The expansion of the working fluid cools the working fluid, and the working fluid is then further cooled via a condenser before being pumped back to the evaporator.

Accordingly, as indicated at 408, operating in the first (power generation) mode includes adjusting (or maintaining) a fifth valve coupled between the evaporator and expander and a sixth valve coupled between the expander and condenser to respective first positions. When the fifth valve is in its first position, the evaporator is fluidically coupled to the inlet of the expander so that the working fluid may flow from the evaporator to the expander. When the sixth valve is in its first position, the outlet of the expander is fluidically coupled to the inlet of the condenser so that the working fluid may flow from the expander to the condenser. Furthermore, as indicated at 410, a first valve coupled between the pump and the evaporator and a second valve coupled between the first valve and the evaporator are each opened (or maintained open) and a seventh valve positioned in the compressor outlet line (and coupled between the expander inlet and evaporator supply line) is closed. In this way, the fluidic coupling between the pump and the evaporator is maintained and not blocked and fluidic coupling between the pump and expander inlet is blocked (e.g., fluidic coupling between the expander inlet line and evaporator supply line via the seventh valve is blocked). Additionally, as indicated at 412, the pump is activated (or maintained activated), so that the working fluid is pumped from the pump to the evaporator (via the first valve and the second valve being open), from the evaporator to the expander (via the fifth valve in the first position), from the expander to the condenser (via the sixth valve in the first position), and from the condenser back to the pump, as indicated at 414. The working fluid that flows from the evaporator to the expander flows via the expander inlet line, and the working fluid enters the expander via the inlet of the expander. The working fluid that flows from the expander to the condenser flows via the expander outlet line, and the working fluid exits the expander via the outlet of the expander. This flow of the working fluid causes the expander to be operated (e.g., rotated) in a first direction that results in energy generation at a generator coupled to the expander, as indicated at 416.

At 418, method 400 includes adjusting a position of a third valve (coupled between the pump and an engine coolant heat exchanger) and/or a fourth valve (coupled between the pump and an engine oil heat exchanger) based on engine coolant temperature and/or engine oil temperature, respectively. During operation in the first operating mode, the third valve and the fourth valve may be commanded to a closed position, such that all working fluid from the pump flows to the evaporator. Such a configuration may allow for desired system efficiency, for example. However, if the engine coolant and/or engine oil reach undesirably high temperatures (for example, if the engine coolant reaches an upper limit threshold temperature, above which engine degradation may occur, or when the engine coolant temperature is greater than the working fluid temperature at the pump), the third valve and/or fourth valve may be at least partially opened to allow the working fluid to flow through the respective heat exchangers. The flow of the lower-temperature working fluid (e.g., lower temperature than the engine coolant or engine oil) through the heat exchangers then allows heat to be transferred from the engine coolant and/or engine oil to the working fluid, thus lowering the temperature of the engine coolant and/or engine oil. Method 400 then returns.

Returning to 404, if it is determined that the engine coolant is below the threshold temperature, method 400 proceeds to 420 to operate the waste heat recovery system in a second (warm up) mode. Operating the waste heat recovery system in the second operating mode may include adjustments to various valves in order to flow working fluid through the evaporator, where waste heat from the engine exhaust (or other suitable waste heat source) is transferred to the working fluid. Then, after the working fluid flows through the evaporator, the working fluid is compressed across the expander. The compression of the working fluid, which occurs as a result of the expander acting as a compressor, is driven by rotation of the expander via a motor and battery (where the motor may be a motor of a motor/generator, where the generator of the motor/generator is used to generate electricity during the first operating mode). The compression of the working fluid drives the working fluid to the heat exchangers (e.g., engine coolant heat exchanger and engine oil heat exchanger). The heat from the working fluid is transferred to the engine coolant and engine oil, for example, helping to expedite engine warm up and lowering the viscosity of the engine oil.

Accordingly, as indicated at 422, operating in the second (warm up) mode includes adjusting (or maintaining) the fifth valve coupled between the evaporator and expander and the sixth valve coupled between the expander and condenser to respective second positions. When the fifth valve is in its second position, the fluidic coupling of the evaporator to the inlet of the expander is blocked, and when the sixth valve is in the second position, fluidic coupling between the evaporator and the outlet of the expander is established via the compressor inlet line 222. Furthermore, as indicated at 424, the first valve coupled between the pump and the evaporator and the second valve coupled between the first valve and the evaporator are each closed (or maintained closed) and the seventh valve in the compressor outlet line is opened (or maintained open). In this way, the fluidic coupling between the pump and the evaporator is blocked, and the fluidic coupling between the expander outlet and condenser is blocked. Further, as indicated at 426, the third valve and fourth valve are each opened (or maintained open), to allow flow of working fluid through the engine coolant heat exchanger and engine oil heat exchanger. Additionally, as indicated at 428, the pump is deactivated (or maintained deactivated).

As a result of the valve positioning and pump deactivation, the working fluid flows from the evaporator to the expander (via the fifth valve in the second position and the sixth valve in the second position), from the expander to the heat exchangers (via each of the third fourth, and seventh valves being open), and from the heat exchangers back to the evaporator, as indicated at 430. The working fluid that flows from the evaporator to the expander flows into the expander via the compressor inlet line, and the working fluid enters the expander via the outlet of the expander. The working fluid that flows from the expander to the heat exchangers flows via the compressor outlet line, and the working fluid exits the expander via the inlet of the expander. This flow of the working fluid causes the expander to be operated (e.g., rotated) in a second direction as a result of a battery-driven motor coupled to the expander, as indicated at 432. Method 400 then returns. For example, method 400 may return to again assess engine coolant temperature, and maintain operation in the second mode if the coolant temperature is still below the threshold temperature, but transition to the first mode if the engine coolant temperature has increased to or above the threshold temperature.

Figure 5:
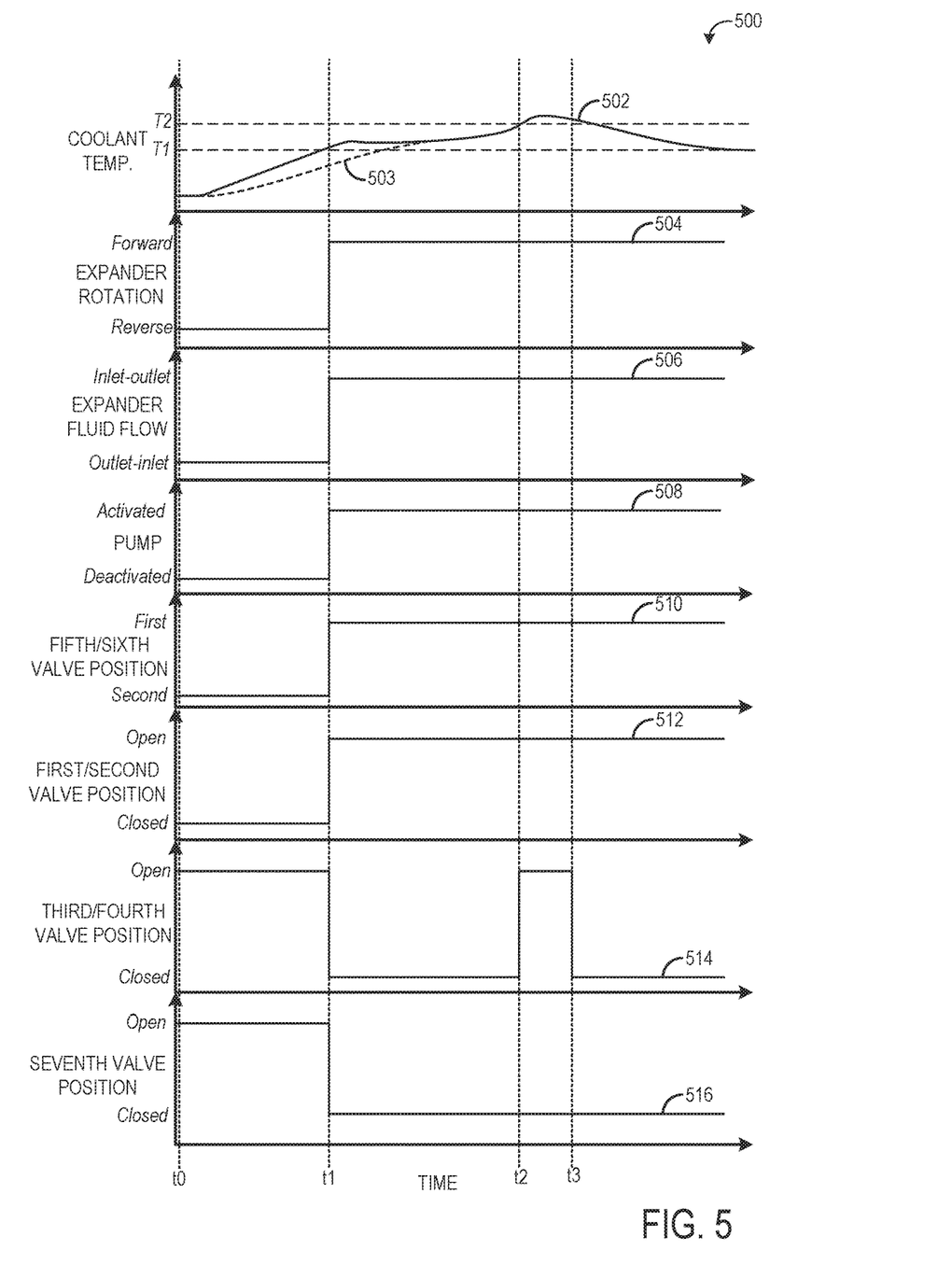
FIG. 5 is a timing diagram illustrating a plurality of operating parameters during execution of the method of FIG. 4.

FIG. 5 is a diagram 500 illustrating a plurality of operating parameters that may be observed in the waste heat recovery system of FIGS. 1-3 during execution of the method of FIG. 4, for example. Diagram 500 of FIG. 5 illustrates engine coolant temperature (plot 502), expander rotational direction (plot 504), expander fluid flow direction (plot 506), pump status (plot 508), respective positions of the fifth and sixth valves (plot 510), respective positions of the first and second valves (plot 512), respective positions of the third and fourth valves (plot 514), and a position of the seventh valve (plot 516). For each operating parameter, time is depicted along the horizontal axis (x-axis) and respective values for each operating parameter are plotted along the vertical axis (y-axis).

At the beginning of the time shown in the diagram (at time t0), the engine of the vehicle in which the waste heat recovery system is installed may be started. As shown by plot 502, the engine coolant temperature may be at ambient temperature, signaling an engine cold start. In response to the relatively low engine coolant temperature (e.g., below the first threshold temperature T1), the waste heat recovery system is operated in the second, warm up mode. As a result, the pump is deactivated (plot 508) and the expander is operated in the second direction (herein, a reverse direction) via motor-driven rotation of the expander, as shown by plot 504. The fifth and sixth valves are placed into the second position (plot 510), the first and second valves are closed (plot 512), the third and fourth valves are open (plot 514), and the seventh valve is open (plot 516). Due to the fifth and sixth valves being placed into the second position and the reverse rotation of the expander, the working fluid is directed from the evaporator (in thermal communication with the engine exhaust gas) to the outlet of the expander, and flows from the outlet to the inlet of the expander, as shown by plot 506, and as such the expander acts as a compressor to compress the working fluid. Owing to the third and fourth valves being open, the heated, compressed working fluid is directed through the engine system heat exchangers (e.g., the engine coolant heat exchanger and engine oil heat exchanger). Heat transfer in the heat exchangers results in the engine system fluids (the engine coolant and engine oil, for example) increasing in temperature, as illustrated by the increase in engine coolant temperature after time t0.

The waste heat recovery system operates in the second mode until the engine coolant reaches the first threshold temperature T1, at time t1. Once the engine coolant reaches the first threshold temperature, additional warming of the engine coolant is not desired, and hence at time t1 the third and fourth valves are closed to stop flow of working fluid to the heat exchangers and the motor may be deactivated, thus stopping the reverse rotation of the expander. Further, the waste heat recovery system then switches to operate in the first, power generation mode at time t1. As a result, the pump is activated, the fifth and sixth valves are moved to the first position, the first and second valves are opened, and the seventh valve is closed. The activation of the pump and valve position adjustments cause the working fluid to flow from the evaporator to the inlet of the expander and then to the outlet of the expander. The working fluid expands across the expander, driving the expander to rotate in the first direction (herein, the forward direction). Rotation of the expander in the first direction generates electricity via the generator coupled to the expander.

The system continues to operate in the first mode, generating electricity from the exhaust gas waste heat. However, prior to time t2, the engine coolant may increase in temperature until it reaches the second threshold temperature T2, owing to sustained high load operation, activation of the air conditioning system, high ambient temperature, and/or other conditions. Thus, to cool the engine coolant, the system initiates operation in the power generation-cooling mode at time t2 by opening the third and fourth valves, allowing the working fluid that has been cooled via expansion across the expander and via travel through the condenser to flow through the engine system heat exchangers, thus absorbing heat from the engine coolant. As a result, the engine coolant temperature decreases and once the engine coolant temperatures falls back below the second threshold temperature, the third and fourth valves may be closed again.

Diagram 500 also schematically shows an example engine coolant temperature plot 503 that may be observed if the waste heat recovery system were not operated in the warm up mode at engine start. As shown by plot 503, the engine coolant will eventually be warmed by combustion in the engine. However, the warming of the engine coolant illustrated by plot 503 may be delayed relative to when the waste heat recovery system is operated in the warm up mode at engine start (as shown by plot 502).

Thus, the disclosed waste heat recovery system is configured to be operated in three modes that provide the functions of power generation, engine warm up, and engine cooling. In the warm up mode, the engine coolant, engine oil, and/or transmission fluid are heated with exhaust heat at cold start. In the power generation mode, the heat from a high temperature source, such as the exhaust or EGR is used to generate power. In the power generation-cooling mode, heat from both high and low temperature sources, such as the engine coolant, engine oil or transmission fluid are absorbed to generate power and reduce the temperatures of the respective systems.

More specifically, responsive to an indication to operate in the warm up mode, the controller stops the pump and switches the expander to run in a reverse direction driven by the motor and battery, thus running in compression mode. The controller also switches the three-way valve downstream of the evaporator (e.g., the fifth valve) to the second position where the compressor inlet line is open (and the expander inlet line is closed). Additionally, the controller switches the three-way valve downstream of the expander (e.g., the sixth valve) to the second position and opens the seventh valve so that the compressor outlet line is open (and closes the first valve so that the line from the pump outlet is closed). The working fluid runs through the compressor inlet line and the compressor outlet line and is heated in evaporator and compressed at the expander before being directed to the heat exchangers (e.g., the engine coolant, engine oil, and/or transmission fluid heat exchangers), where the coolant, engine oil (or other fluids) are warmed up.

Responsive to an indication to operate in the power generation mode, for example in response to the coolant, engine oil, etc., reaching a respective desired temperature, the controller is configured to close the valves upstream of the heat exchangers (e.g., the third valve and fourth valve), start the pump, switch the expander to expansion mode, switch the three-way valve downstream of the evaporator (e.g., the fifth valve) to the first position where the expander inlet line is open (and the compressor inlet line is closed). Also, the controller is configured to switch the three-way valve downstream of the expander (e.g., the sixth valve) to the first position and open the first valve so that the pump outlet line is open (and close the seventh valve so that the compressor outlet line is closed). The working fluid is heated by exhaust gas in the evaporator, runs through expander, the condenser, and is compressed with the pump, then goes back to the evaporator (e.g., via the second valve being open). The power from the expander may be used for various vehicle operations, such as being stored in the vehicle battery, driving the crankshaft, driving a supercharger compressor, etc.

Responsive to an indication to operate in the power generation-cooling mode, for example when the temperature of coolant, engine oil, and/or transmission fluid is too high, the system maintains the operation in the power generation mode, but adjusts the position of the heat exchanger valves (e.g., the third and fourth valves) to control the working fluid through the heat exchanger with coolant and engine oil (or others) to cool coolant and engine oil (or others). At the same time, the working fluid absorbs the heat from coolant, engine oil (or others) for additional heat recovery.

By including a Rankine cycle waste heat recovery system configured to operate in the three modes of operation described herein, various benefits may be achieved. For example, the ability to generate power, warm up the engine/transmission, and cool down the engine/transmission may be provided in one system, thus providing benefits for cost saving, packaging, and simplifying the system.

The technical effect of operating a Rankine cycle waste heat recovery system in a warm up mode to rapidly heat the engine, reducing the amount of time spent at rich air-fuel ratio and the time to reach emission control device operating temperature, thus decreasing fuel consumption and emissions, without utilizing a separate system for engine warm up and waste heat recovery power generation.

An example for a method includes, responsive to a first condition, expanding a working fluid of a waste heat recovery system via an expander to generate electricity; and responsive to a second condition, compressing the working fluid of the waste heat recovery system via the expander to transfer heat to an engine. In a first example of the method, expanding the working fluid of the waste heat recovery system to generate electricity comprises rotating the expander of the waste heat recovery system in a first direction and generating electricity via a generator coupled to the expander. In a second example of the method, which optionally includes the first example, compressing the working fluid of the waste heat recovery system comprises rotating the expander in a second direction by a motor to compress the working fluid. In a third example of the method, which optionally includes one or both of the first and second examples, expanding the working fluid of the waste heat recovery system to generate electricity comprises: flowing the working fluid through the expander of the waste heat recovery system in a first direction, including flowing the working fluid from an evaporator in thermal communication with an engine exhaust system to an inlet of the expander, through the expander, and out an outlet of the expander, and translating the expansion into electricity via a generator coupled to the expander. In a fourth example of the method, which optionally comprises one or more or each of the first through third examples, compressing the working fluid of the waste heat recovery system comprises: flowing the working fluid through the expander in a second direction, including flowing the working fluid from the evaporator to the outlet of the expander, through the expander, and out the inlet of the expander, and transferring heat from the compressed working fluid to the engine by flowing the compressed working fluid from the inlet of the expander to one or more heat exchangers in thermal communication with the engine. In a fifth example of the method, which optionally comprises one or more or each of the first through fourth examples, the first condition comprises engine coolant temperature above a first threshold temperature and the second condition comprises engine coolant temperature below the first threshold temperature, and the method further comprises, during the first condition, blocking flow of the working fluid through the one or more heat exchangers. In a sixth example of the method, which optionally comprises one or more or each of the first through fifth examples, the method further comprises, responsive to the engine coolant temperature above a second threshold temperature, higher than the first threshold temperature, flowing the working fluid through the one or more heat exchangers. In a seventh example of the method, which optionally comprises one or more or each of the first through sixth examples, operating the expander of the waste heat recovery system in the first direction further comprises flowing the working fluid from the outlet of the expander to a condenser, from the condenser to a pump, and from the pump to the evaporator. In an eighth example of the method, which optionally comprises one or more or each of the first through seventh examples, operating the expander of the waste heat recovery system in the second direction further comprises flowing the working fluid from the inlet of the expander to the one or more heat exchangers, and flowing the working fluid from the one or more heat exchangers to the evaporator, bypassing the condenser and the pump.

An example of an exhaust heat recovery system includes one or more engine system heat exchangers; an evaporator configured to transfer heat from an engine exhaust system to a working fluid; a pump configured to selectively supply the working fluid to the one or more engine system heat exchangers and the evaporator; an expander/compressor downstream of the evaporator; a condenser downstream of the expander/compressor and upstream of the pump; and a controller configured to: during a first mode, harvest heat from the engine exhaust system via the evaporator and convert the heat into electricity via the expander/compressor by operating the expander/compressor as an expander driving a motor/generator, and flowing expanded working fluid through the condenser; and during a second mode, harvest heat from the engine exhaust system via the evaporator and heat one or more engine components by operating the expander/compressor as a compressor driven by the motor/generator, the working fluid compressed by the compressor supplied to the one or more engine system heat exchangers and bypassing the condenser. In a first example of the system, the system further comprises an expander inlet line fluidically coupling an outlet of the evaporator to an expander inlet of the expander/compressor; an expander outlet line fluidically coupling an expander outlet of the expander/compressor to an inlet of the condenser; a compressor inlet line fluidically coupling the outlet of the evaporator to a compressor inlet of the expander/compressor; and a compressor outlet line fluidically coupling a compressor outlet of the expander/compressor to a conduit upstream of the one or more engine system heat exchangers. In a second example of the system, which optionally includes the first example, during the first mode, working fluid is configured to flow from the evaporator to the expander/compressor via the expander inlet line and from the expander/compressor to the condenser via the expander outlet line, and during the second mode, working fluid is configured to flow from the evaporator to the expander/ compressor via the compressor inlet line and from the expander/compressor to the one or more engine system heat exchangers via the compressor outlet line. In a third example of the system, which optionally includes one or both of the first and second examples, the system further comprises a first valve positioned between the pump and the evaporator; a second valve positioned between the evaporator and the expander/compressor; a third valve positioned between the expander and the condenser, and the controller is configured to, during the first mode, open the first valve and adjust a position of the second valve to a first position of the second valve, and therein establish fluidic communication between the pump and an inlet of the evaporator and between the outlet of the evaporator and the expander inlet of the expander/compressor via the expander inlet line, and adjust a position of the third valve to a first position of the third valve, and during the second mode, adjust the position of the second valve to a second position of the second valve and adjust a position of the third valve to a second position of the third valve, and therein establish fluidic communication between the outlet of the evaporator and the compressor inlet of the expander/compressor via the compressor inlet line, and close the first valve to block fluidic communication between the pump and the evaporator. In a fourth example of the system, which optionally comprises one or more or each of the first through third examples, the one or more engine system heat exchangers comprise a first heat exchanger in thermal communication with engine coolant and a second heat exchanger in thermal communication with engine oil, and the system further comprises: a third valve upstream of the first heat exchanger; and a fourth valve upstream of the second heat exchanger; and wherein the controller is configured to, during the first mode, close the third valve and close the fourth valve, and during the second mode, open the third valve and open the fourth valve. In a fifth example of the system, which optionally comprises one or more or each of the first through fourth examples, the system further comprises an engine including a plurality of cylinders configured to supply exhaust gas to the engine exhaust system and a transmission configured to drive one or more wheels, the transmission coupled to one or more of the engine and an electric machine, wherein the first mode comprises engine coolant temperature above a first threshold temperature, wherein the second mode comprises engine coolant temperature below the first threshold temperature, and wherein the controller is configured to, responsive to engine coolant temperature above a second threshold temperature, higher than the first threshold temperature, cool the one or more engine components by flowing the working fluid from the condenser through the one or more engine system heat exchangers.

A further example of a method comprises, responsive to an engine temperature above a threshold temperature, operating an exhaust waste heat recovery system in a power generation mode to expand a working fluid of the exhaust waste heat recovery system by directing the working fluid through an inlet of the expander and to an outlet of the expander, and generating electricity via rotation of the expander in a first direction; and responsive to the engine temperature below the threshold temperature, operating the exhaust waste heat recovery system in a warm up mode to transfer exhaust heat to an engine by directing the working fluid through the outlet of the expander and to the inlet of the expander, and compressing the working fluid via the expander operated in a second direction, opposite the first direction. In a first example of the method, generating electricity via rotation of the expander in the first direction comprises generating electricity via a generator of a motor/generator coupled to the expander, and storing the electricity in an energy storage device. In a second example of the method, which optionally comprises the first example, compressing the working fluid via the expander operated in the second direction comprises rotating the expander via a motor of the motor/generator. In a third example of the method, which optionally comprises one or both of the first and second examples, the method further comprises directing compressed working fluid from the inlet of the expander to one or more heat exchangers in thermal communication with the engine. In a fourth example of the method, which optionally comprises one or more or each of the first through third examples, the method further comprises directing the working fluid through an evaporator of the exhaust waste heat recovery system in thermal communication with an exhaust system of the engine; responsive to the engine temperature above the threshold temperature, directing the working fluid from the evaporator to the inlet of the expander; and responsive to the engine temperature below the threshold temperature, directing the working fluid from the evaporator to the outlet of the expander.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to a first condition, expanding a working fluid of a waste heat recovery system via an expander to generate electricity, and blocking flow of the working fluid through one or more heat exchangers in thermal communication with an engine; and
responsive to a second condition, compressing the working fluid of the waste heat recovery system via the expander to transfer heat to the engine via the one or more heat exchangers.

2. The method of claim 1, wherein expanding the working fluid of the waste heat recovery system to generate electricity comprises rotating the expander of the waste heat recovery system in a first direction and generating electricity via a generator coupled to the expander.

3. The method of claim 2, wherein compressing the working fluid of the waste heat recovery system comprises rotating the expander in a second direction by a motor to compress the working fluid.

4. The method of claim 1, wherein expanding the working fluid of the waste heat recovery system to generate electricity comprises:
flowing the working fluid through the expander of the waste heat recovery system in a first direction, including flowing the working fluid from an evaporator in thermal communication with an engine exhaust system to an inlet of the expander, through the expander, and out an outlet of the expander, and translating the expansion into electricity via a generator coupled to the expander.

5. The method of claim 4, wherein compressing the working fluid of the waste heat recovery system comprises:
flowing the working fluid through the expander in a second direction, including flowing the working fluid from the evaporator to the outlet of the expander, through the expander, and out the inlet of the expander, and
transferring heat from the compressed working fluid to the engine by flowing the compressed working fluid from the inlet of the expander to the one or more heat exchangers in thermal communication with the engine.

6. The method of claim 5, wherein the first condition comprises an engine coolant temperature above a first threshold temperature and the second condition comprises the engine coolant temperature below the first threshold temperature.

7. The method of claim 6, further comprising, responsive to the engine coolant temperature above a second threshold temperature, higher than the first threshold temperature, flowing the working fluid through the one or more heat exchangers.

8. The method of claim 5, wherein operating the expander of the waste heat recovery system in the first direction further comprises flowing the working fluid from the outlet of the expander to a condenser, from the condenser to a pump, and from the pump to the evaporator.

9. The method of claim 8, wherein operating the expander of the waste heat recovery system in the second direction further comprises flowing the working fluid from the inlet of the expander to the one or more heat exchangers, and flowing the working fluid from the one or more heat exchangers to the evaporator, bypassing the condenser and the pump.

10. An exhaust heat recovery system, comprising:
one or more engine system heat exchangers;
an evaporator configured to transfer heat from an engine exhaust system to a working fluid;
a pump configured to selectively supply the working fluid to the one or more engine system heat exchangers and the evaporator;
an expander/compressor downstream of the evaporator;
a condenser downstream of the expander/compressor and upstream of the pump; and
a controller configured to:
during a first mode, harvest heat from the engine exhaust system via the evaporator and convert the heat into electricity via the expander/compressor by operating the expander/compressor as an expander driving a motor/generator, and flowing expanded working fluid through the condenser; and
during a second mode, harvest heat from the engine exhaust system via the evaporator and heat one or more engine components by operating the expander/compressor as a compressor driven by the motor/generator, the working fluid compressed by the compressor supplied to the one or more engine system heat exchangers and bypassing the condenser.

11. The system of claim 10, further comprising:
an expander inlet line fluidically coupling an outlet of the evaporator to an expander inlet of the expander/compressor;
an expander outlet line fluidically coupling an expander outlet of the expander/compressor to an inlet of the condenser;
a compressor inlet line fluidically coupling the outlet of the evaporator to a compressor inlet of the expander/compressor; and
a compressor outlet line fluidically coupling a compressor outlet of the expander/compressor to a conduit upstream of the one or more engine system heat exchangers.

12. The system of claim 11, wherein during the first mode, working fluid is configured to flow from the evaporator to the expander/compressor via the expander inlet line and from the expander/compressor to the condenser via the expander outlet line, and during the second mode, working fluid is configured to flow from the evaporator to the expander/compressor via the compressor inlet line and from the expander/compressor to the one or more engine system heat exchangers via the compressor outlet line.

13. The system of claim 11, further comprising:
a first valve positioned between the pump and the evaporator;
a second valve positioned between the evaporator and the expander/compressor; and
a third valve positioned between the expander and the condenser, and wherein the controller is configured to,
during the first mode, open the first valve and adjust a position of the second valve to a first position of the second valve, and therein establish fluidic communication between the pump and an inlet of the evaporator and between the outlet of the evaporator and the expander inlet of the expander/compressor via the expander inlet line, and adjust a position of the third valve to a first position of the third valve, and during the second mode, adjust the position of the second valve to a second position of the second valve and adjust a position of the third valve to a second position of the third valve, and therein establish fluidic communication between the outlet of the evaporator and the compressor inlet of the expander/compressor via the compressor inlet line, and close the first valve to block fluidic communication between the pump and the evaporator.

14. The system of claim 13, wherein the one or more engine system heat exchangers comprise a first heat exchanger in thermal communication with engine coolant and a second heat exchanger in thermal communication with engine oil, and where the system further comprises:
a fifth valve upstream of the first heat exchanger; and
a fourth valve upstream of the second heat exchanger; and
wherein the controller is configured to, during the first mode, close the fifth valve and close the fourth valve, and during the second mode, open the fifth valve and open the fourth valve.

15. The system of claim 10, further comprising an engine including a plurality of cylinders configured to supply exhaust gas to the engine exhaust system and a transmission configured to drive one or more wheels, the transmission coupled to one or more of the engine and an electric machine, wherein the first mode comprises engine coolant temperature above a first threshold temperature, wherein the second mode comprises engine coolant temperature below the first threshold temperature, and wherein the controller is configured to, responsive to engine coolant temperature above a second threshold temperature, higher than the first threshold temperature, cool the one or more engine components by flowing the working fluid from the condenser through the one or more engine system heat exchangers.

16. A method comprising:
directing a working fluid through an evaporator of an exhaust waste heat recovery system in thermal communication with an exhaust system of an engine;
responsive to an engine temperature above a threshold temperature, operating the exhaust waste heat recovery system in a power generation mode to expand the working fluid of the exhaust waste heat recovery system by directing the working fluid through an inlet of an expander and to an outlet of the expander, and generating electricity via rotation of the expander in a first direction; and
responsive to the engine temperature below the threshold temperature, operating the exhaust waste heat recovery system in a warm up mode to transfer exhaust heat to an engine by directing the working fluid through the outlet of the expander and to the inlet of the expander, compressing the working fluid via the expander operated in a second direction, opposite the first direction, and directing the compressed working fluid from the inlet of the expander to one or more engine system heat exchangers, the one or more engine system heat exchangers configured to transfer heat from the compressed working fluid to the engine.

17. The method of claim 16, wherein the threshold temperature is a first threshold temperature, wherein generating electricity via rotation of the expander in the first direction comprises generating electricity via a generator of a motor/generator coupled to the expander, and storing the electricity in an energy storage device, and further comprising, when operating the exhaust waste heat recovery system in the power generation mode, blocking flow of the working fluid through the one or more engine system heat exchangers responsive to the engine temperature being above the first threshold temperature and lower than a second threshold temperature.

18. The method of claim 17, wherein compressing the working fluid via the expander operated in the second direction comprises rotating the expander via a motor of the motor/generator, and further comprising, when operating the exhaust waste heat recovery system in the power generation mode, flowing the working fluid through the one or more engine system heat exchangers responsive to the engine temperature being greater than the second threshold temperature.

19. The method of claim 18, wherein the one or more engine system heat exchangers comprise an engine coolant heat exchanger configured to transfer heat from the compressed working fluid to engine coolant.

20. The method of claim 16, further comprising:
responsive to the engine temperature above the threshold temperature, directing the working fluid from the evaporator to the inlet of the expander; and
responsive to the engine temperature below the threshold temperature, directing the working fluid from the evaporator to the outlet of the expander.

* * * * *